United States Patent
Ziock et al.

(10) Patent No.: US 11,568,766 B2
(45) Date of Patent: Jan. 31, 2023

(54) SECURITY COMPONENT WITH FIBER BRAGG GRATING

(71) Applicant: UT-Battelle, LLC, Oak Ridge, TN (US)

(72) Inventors: Klaus-Peter Ziock, Oak Ridge, TN (US); William R. Ray, Oak Ridge, TN (US); James R. Younkin, Oak Ridge, TN (US); Brandon R. Longmire, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 9 days.

(21) Appl. No.: 17/223,616

(22) Filed: Apr. 6, 2021

(65) Prior Publication Data

US 2021/0312837 A1 Oct. 7, 2021

Related U.S. Application Data

(60) Provisional application No. 63/006,102, filed on Apr. 7, 2020.

(51) Int. Cl.
*G09F 3/03* (2006.01)
*G01D 5/353* (2006.01)
*G01K 11/3206* (2021.01)
*G01L 1/24* (2006.01)

(52) U.S. Cl.
CPC ....... *G09F 3/0376* (2013.01); *G01D 5/35316* (2013.01); *G01K 11/3206* (2013.01); *G01L 1/246* (2013.01)

(58) Field of Classification Search
CPC .............. G09F 3/0376; G01D 5/35316; G01K 11/3206; G01L 1/246
See application file for complete search history.

(56) References Cited

U.S. PATENT DOCUMENTS

| 5,351,324 A | 9/1994 | Forman |
| 11,056,024 B2 * | 7/2021 | Schade ................... G06F 21/00 |
| 2019/0066543 A1 | 2/2019 | Schade et al. |

* cited by examiner

*Primary Examiner* — John Bedtelyon
(74) *Attorney, Agent, or Firm* — Warner Norcross + Judd LLP

(57) ABSTRACT

A fiber Bragg grating (FBG) security component for single-party and multi-party monitoring is provided. The security component includes an optical fiber having a plurality of Bragg gratings. The Bragg gratings provide a spectral response that is randomized based on the manufacture of the security component. For single-party use, the spectral response provides a reproducible spectral signature when interrogated with an optical signal. For multi-party use, each party applies a known optical interrogation signal to the security component and applies an external stress known only to the respective monitoring party. The resulting shift in the spectral signature is unique to each monitoring party, making it extremely difficult to successfully counterfeit the security component's response for all such parties.

10 Claims, 7 Drawing Sheets

SECURITY COMPONENT WITH FIBER BRAGG GRATING

CROSS-REFERENCE TO RELATED APPLICATIONS

This application claims the benefit of U.S. Provisional Application 63/006,102, filed Apr. 7, 2020, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to optical fiber intrusion detection systems, and, in particular, tamper-evident components having optical fibers with Bragg gratings.

BACKGROUND OF THE INVENTION

Tags and seals have been used throughout human history, originally to authenticate documents and to indicate whether tampering has occurred. In the last several decades, optical fibers have been used to verify authenticity and to detect for tampering. At the most basic level, optical fiber-based intrusion detection systems operate by detecting a break in the optical fibers that span an enclosure. Optical fibers have also been used to monitor intrusion by recording changes in the light that is returned through the optical fiber. (Allwood et al., "Optical Fiber Sensors in Physical Intrusion Detection Systems: A Review," *IEEE Sensors Journal*, vol. 16, pp. 5497-5509 (2016)). Generally, such systems require continual monitoring of light sent through the optical fiber. This is because changes to the fiber are generally not sustained beyond the actual intrusive event (e.g., changes caused by vibrations from intrusive activity result only in a transient signal that does not persist beyond the duration of the vibrations).

One can introduce periodic modulations of the refractive index of optical fibers over short distances (~1 cm) with a spacing that is comparable to the wavelength of light sent through the fiber, such that the modulations form a Bragg reflector. This causes light in resonance (wavelength) with the structure to be reflected. When such a structure is illuminated with a broadband light source, the resonant portions of the spectrum being reflected toward the optical input can be monitored. Several such Bragg gratings, each with its own resonant frequency, can be assembled in a single fiber, creating resonant reflections of different frequencies of light. This technique has been used to measure stress in structures by affixing a fiber with these gratings to the structure. (Szillasi et al., "One year of FOS measurements in CMS experiment at CERN," *Physics Procedia, vol.* 37, pp. 79-84 (2012)). If the structure is deformed, it will also deform the fiber, causing a shift in the periodic structure of the grating which results in both a shift in the wavelength of the reflected light and changes in the shape of the reflected component.

Recent research has also proposed the continuous monitoring of security breaches using an array of fiber Bragg spectrometers in a floor mat to monitor for foot traffic. (Catalano et al., "An optical fiber intrusion detection system for railway security," *Sensors and Actuators A: Physical*, vol. 253, pp. 91-100 (2017)). Other research has proposed a tamper seal in which fiber and multiple grating structures are directly written into a thin glass slide which is then affixed over an integrated circuit. (Thiel et al., "Planar ultra thin glass seals with optical fiber interface for monitoring tamper attaches on security eminent components," *Optics and Lasers in Engineering*, vol. 98, pp. 89-98 (2017)).

Despite the foregoing improvements in optical fiber intrusion detection systems, there remains a continued need for an improved tamper evident seal for single and multi-party use, and, in particular, a fiber Bragg grating (FBG) security component.

SUMMARY OF THE INVENTION

A FBG-based security component for single-party and multi-party use is provided. The security component includes an optical fiber having a plurality of Bragg gratings. The optical fiber provides a spectral response that is randomized based on the manufacture of the security component. For single-party use, the spectral response provides a reproducible spectral signature when interrogated with a broad spectrum signal for authentication and tamper detection. For multi-party use, each party applies a broad spectrum signal to the security component and applies an external stress known only to the respective monitoring party. The resulting shift in the spectral signature is unique to each monitoring party, making it extremely difficult to successfully counterfeit the security component's response for all such parties.

In one embodiment, the security component is configured as a tab to identify the monitored item. Alternatively or in addition, the security component is configured as a seal to indicate whether tampering has occurred. The plurality of FBGs are distributed throughout the security component such that, when probed by light having a broad spectrum, the FBGs modify the broad spectrum by a spectral response of the FBGs and by both internal and external stresses. The internal stresses are caused by the manner in which the distributed FBGs are supported within the security component, and external stresses may be induced during readout of the spectral response of the security component. The external stresses are unique to each monitoring party, such that each monitoring party receives a unique spectral signature known only to that party that is not easily spoofed. The unique spectral signature can be used as a reference signal to detect for tampering or to verify the identify of the item to which the FBG-based security component is attached.

To manufacture the security component according to one embodiment, multiple FBGs are formed in a single optical fiber, resulting in a FBG array. The FBG array is coated with a release agent and encapsulated within an epoxy as a planar body, which applies a randomized stressor field to the FBG array. The security component is configured so that a stakeholder can apply a temporary external pressure field to an exposed surface of the security component while the FBG array is read out. This will cause the security component to supply a different response than would be obtained without the external field. This enables the concept of individual keys for use when multiple stakeholders are concerned with the monitored item. In addition to the unaltered signature, each stakeholder can use a different (secret) pressure field to obtain their own unique response from the security component. With the pressure field and its response known only to each stakeholder, it would be very difficult to successfully counterfeit the security component's response for all parties.

The security component is interrogated via a fiber optic connection, and such a connection can be retained for periodic remote inspections. Because the signature is spectral rather than intensity based, it is immune to issues normally associated with long fiber-optic runs and the effects of nuclear damage. The FBG-based security component presents a new concept for authentication, in that different stakeholders can apply their own unique key to obtain a correspondingly unique signature from the security component, providing an additional level of security, and making it more difficult to spoof the security component.

These and other features of the invention will be more fully understood and appreciated by reference to the description of the embodiments and the drawings.

DETAILED DESCRIPTION OF THE CURRENT EMBODIMENT

As discussed herein, the current embodiments generally relate to a FBG-based security component for single-party and multi-party use. The spectral response of the security component is randomized based the manufacture of the security component. The FBG-based security component and its manufacture are discussed in Part I below, and a method for single-party and multi-party authentication or tamper detection is discussed in Part II below.

I. FBG-Based Security Component

Figure 1:
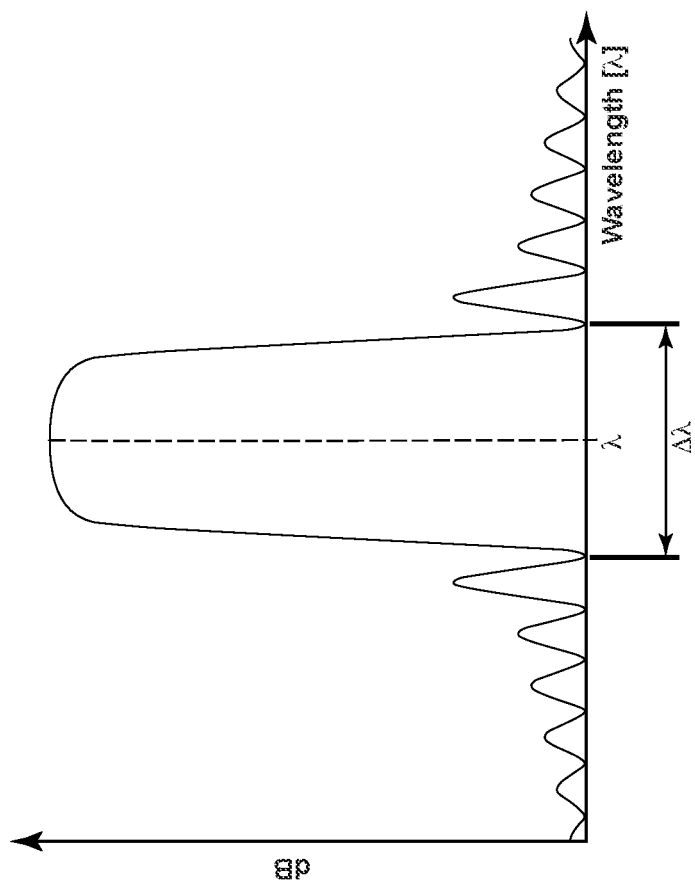
FIG. 1 illustrates a prior art optical fiber including a plurality of Bragg gratings and a graph depicting a spectral signature of the optical fiber.
Figure 1:
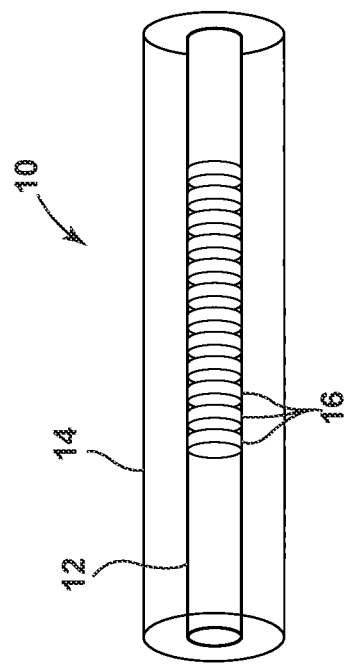

Referring to FIG. 1, an optical fiber is illustrated and generally designated 10. The optical fiber 10 includes two concentric layers: a core 12 and a cladding 14. The core 12 and the cladding 14 have different refractive indices, such that light is guided by internal reflection at the boundary between the core 12 and the cladding 14. The optical fiber 10 includes a plurality of Bragg gratings 16 that are photo-inscribed into the core 12 and serially disposed therein. The Bragg gratings 16 are written into the optical fiber 10 by short pulses of laser illumination that locally alter the refractive index of the core 12. The index changes are created with a regular period over a short length of the optical fiber 10. When light with a wavelength resonant with this period is sent down the fiber, the light undergoes Bragg reflection at the Bragg gratings 16, resulting in a spectral response.

Figure 2:
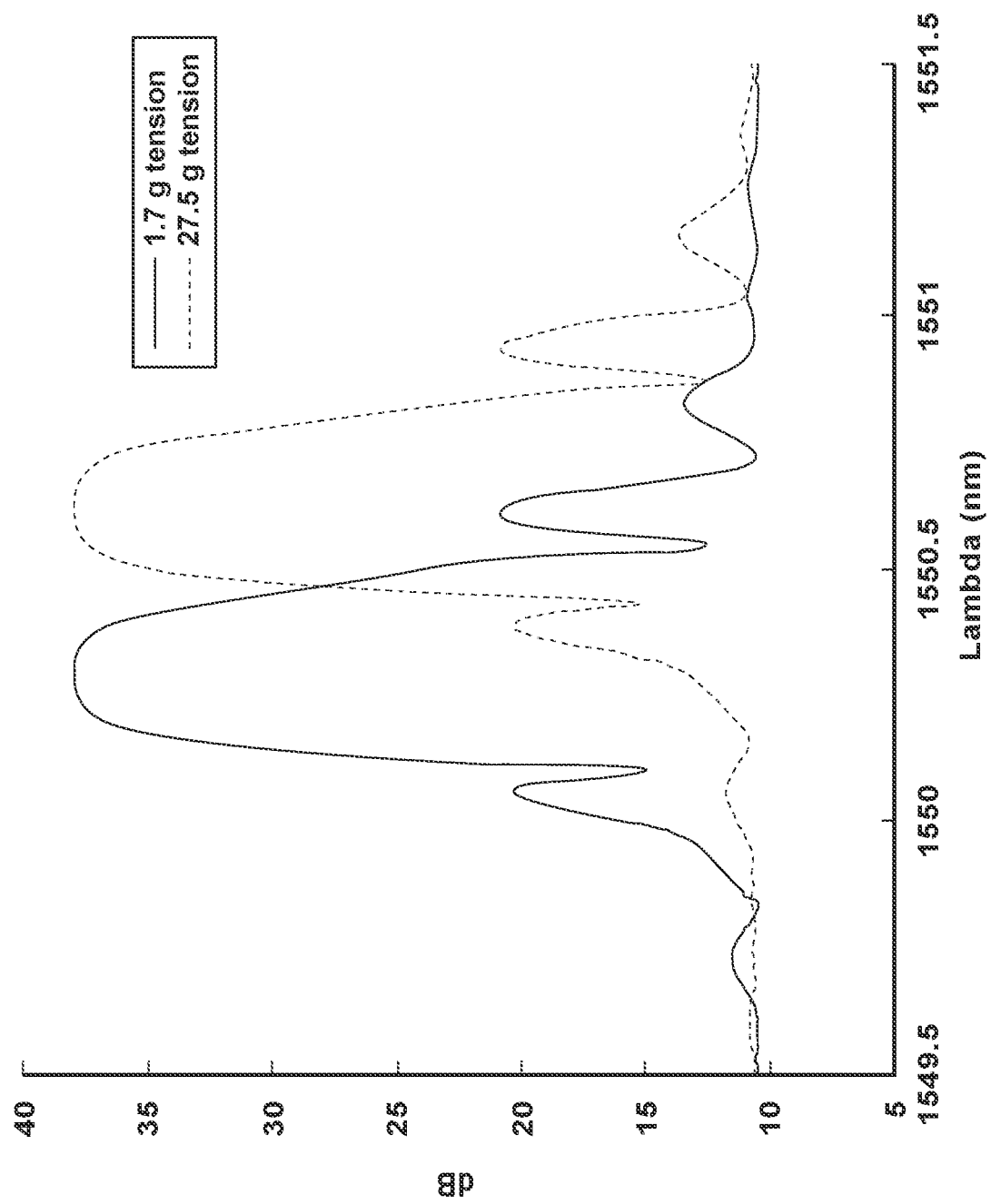
FIG. 2 is a graph depicting a shift in the spectral signature of an optical fiber as a result of an axial strain.

An example spectral response from a uniform series of Bragg gratings is also shown in FIG. 1. The spectral response includes a primary lobe and multiple side lobes. The spectral response can be characterized by the wavelength of the primary lobe ($\lambda$), the peak reflected power of the primary lobe, and the spectral shape of the primary and side lobes. Temperature, pressure, and axial strain cause changes in the periodicity of the Bragg gratings 16, which alter the central wavelength of the spectral response and potentially alter the peak reflected power and the spectral shape of the reflection. As one example, FIG. 2 illustrates a shift in the spectral response (reflected light) due to a change in tension on an optical fiber having Bragg gratings. The center wavelength shifted in this example by approximately 0.3 nm, which is detectable using an optical interrogator, for example a FAZT-I4G optical interrogator manufactured by Faz Technology.

Figure 3:
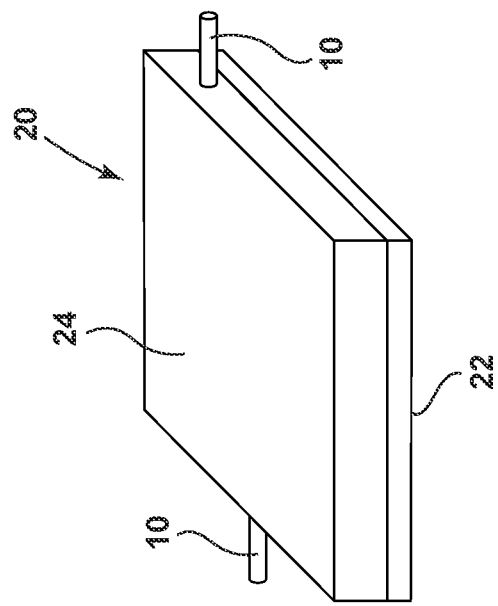
FIG. 3 illustrates steps in the manufacture of a security component in accordance with an embodiment of the present invention.
Figure 3:
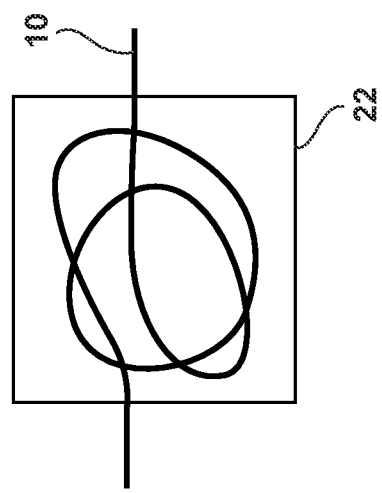

As noted above, the optical fiber 10 can be integrated into a security component 20 for authentication and/or tamper detection. As shown in FIG. 3, the security component 20 includes a substrate 22, for example a thin metal or polymer layer. In the illustrated embodiment, the substrate 22 is approximately square, however in other embodiments the substrate 22 can comprise other shapes, including round and polygonal shapes. The optical fiber 10 is routed in an arbitrary manner on the substrate, optionally in a meandering manner. The optical fiber 10 can optionally include a release agent on its exterior, for example a silicone-based release agent.

The optical fiber 10 is then potted in an epoxy. The epoxy encapsulates the optical fiber 10 and provides a reinforcing matrix 24, while ensuring some deformability. The reinforcing matrix 24 maintains the desired geometrical form of the security component and allows the transfer of strain to the optical fiber 10. Suitable epoxies include a thermoplastic or thermoset resin. When the epoxy has cured, the resulting security component 20 includes an optical fiber 10 having a plurality of Bragg gratings serially disposed therein, the optical fiber being supported on a thin substrate 22 and potted in place as a thin, rectangular-shaped object, with the optical fiber 10 protruding from one or more side edges of the security component 20. The optical fiber 10 is potted in multiple layers. For example, the portion(s) of the optical fiber 10 comprising Bragg gratings can be potted in the thermoplastic or thermoset resin and allowed to cure. Once cured, the optical fiber 10 is again potted in a resin, further encapsulating the Bragg gratings and the remaining extent of the optical fiber 10. Once cured, the reinforcing matrix provides dimensional stability for the optical fiber 10. Though not shown, the security component 20 can include an upper substrate, opposite of the lower substrate 22, sandwiching the reinforcing matrix 24 therebetween, optionally formed from a thin metal or polymer layer.

Figure 4:
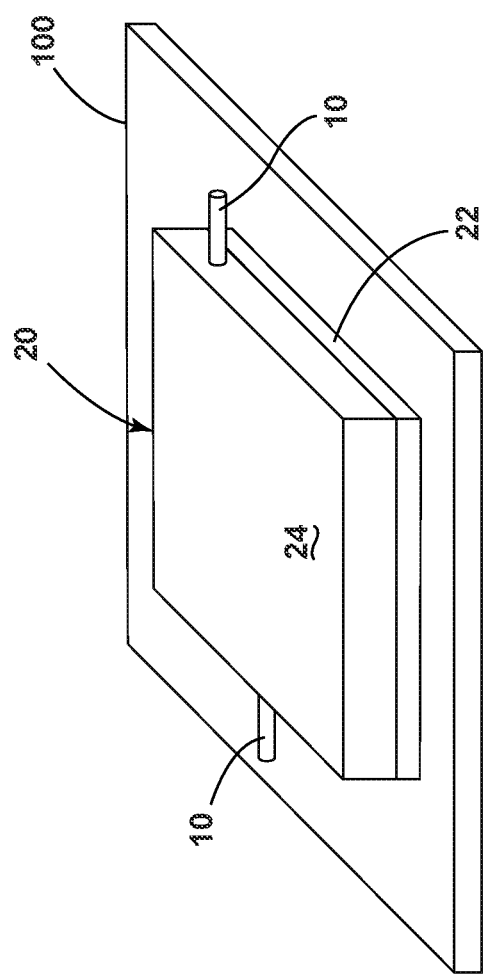
FIG. 4 illustrates a security component in accordance with an embodiment of the present invention as joined to a monitored object.
Figure 7A:
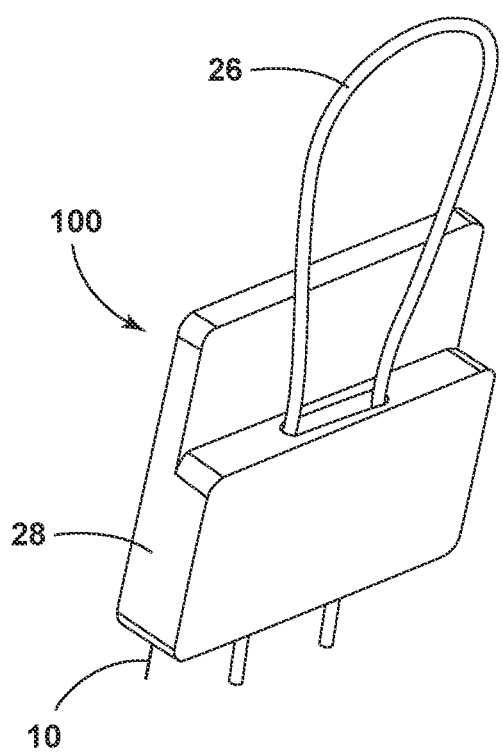
FIGS. 7A-7B illustrate a security component integrated into a cable seal.
Figure 7B:
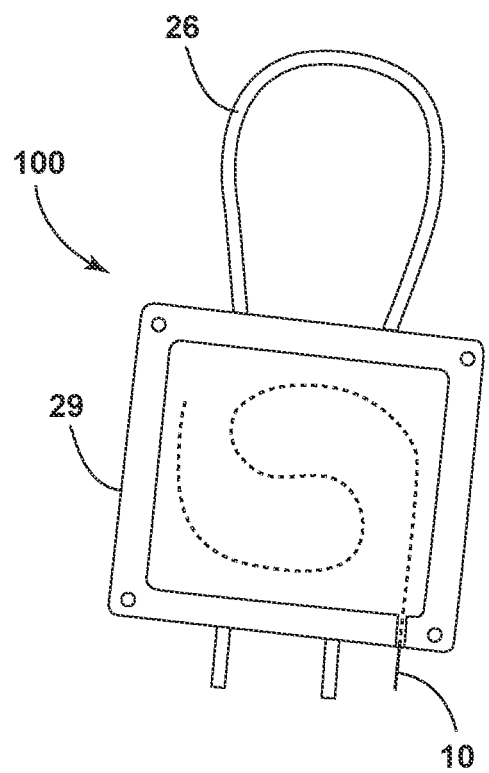

During polymerization of the reinforcing matrix 24, the optical fiber 10 undergoes dimensional changes that result in residual strains. If attached to a monitored item 100 as shown in FIG. 4 (for example, a microchip, a nuclear fuel element, a cable seal, or other item) along a bond line additionally alters the internal stressor field. For example, the adhesion of the security component 20 to a monitored item 100 interacts with the internal stressor field to further modify the spectral signature of the optical fiber. In other embodiments however the monitored item 100 is a cable seal comprising a braided cable 26 and a locking body 28. As shown in FIG. 7A, for example, the optical fiber 10 is potted within the locking body 28, such that tampering of the cable seal (e.g., retraction and reinsertion of the braided cable 26 into the locking body 28) is detectable based on changes in the spectral response of the optical fiber 10. As alternatively shown in FIG. 7B, the optical fiber 10 is threaded through a hole or break in a supporting structure 29 and distributed therein on or above a substrate in an arbitrary manner. The optical fiber 10 is then potted with the braided cable 26 of the cable seal, such that attempts to bypass the cable seal are detectable based on changes in the spectral response of the optical fiber 10, e.g., changes to the central wavelength of the primary peak, the peak reflected power, and/or the spectral shape of the reflection.

Figure 5:
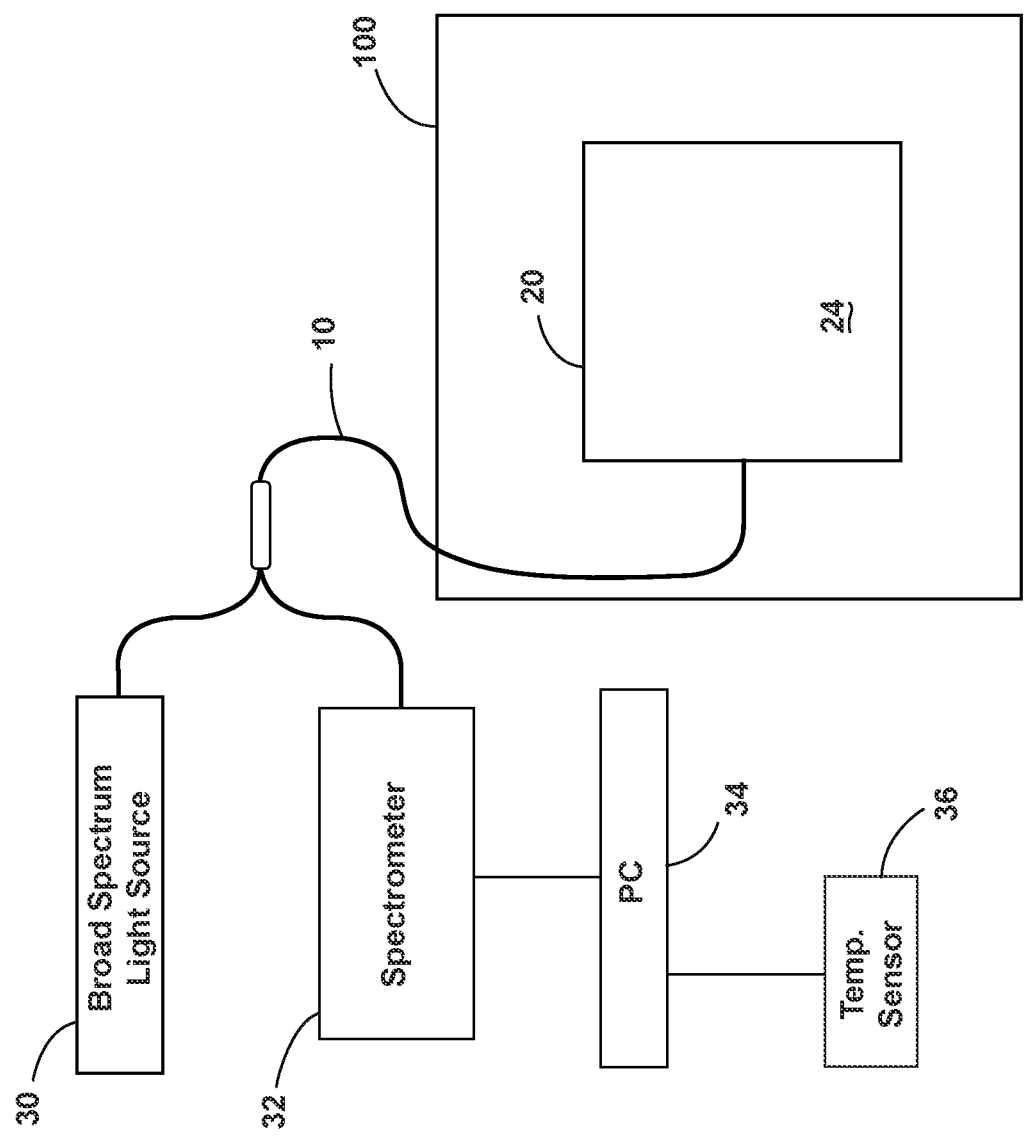
FIG. 5 is a schematic diagram of a system including a broad spectrum light source and a spectrometer.

The wavelength-encoded response of the optical fiber 10 is then performed with a broadband light source 30 coupled to a spectrometer 32, shown in FIG. 5. Because temperature also induces a Bragg wavelength shift, the spectral signature is stored to computer memory as a reference signal for a given temperature. As one option, the optical fiber 10 can include a fiber Bragg grating that is external to the security component 20, such that a processor 34 can de-couple temperature-induced wavelength shifts from stress-induced wavelength shifts in the spectral response of the security component 20. Alternatively, a temperature sensor 36 outputs temperature data to the processor 34, such that the appropriate reference signal can be selected as a baseline for authentication and/or tamper detection in the manner described below. An alternative approach uses the average spectral shift of all of the FBGs in the security component to determine temperature.

II. Single-Party and Multi-Party Interrogation

Single-party interrogation of the security component 20 includes coupling a light source 30 to the optical fiber 10, the light source 30 providing broad-spectrum light. A spectrometer 32 is also coupled to the optical fiber 10 and receives the reflection spectrum. The reflection spectrum includes a local maximum associated with each grouping of Bragg gratings in the optical fiber 10, with each grouping being tuned for a different wavelength. A processor 34 is coupled to the spectrometer 32 and is adapted to process the modified broad spectrum (i.e., the reflection spectrum) for comparison against a reference signal for a given temperature, the reference signal being stored in computer readable memory. An optional temperature sensor 36 outputs temperature data to the processor 34, such that a shift in the reflection spectrum due to a change in temperature can be de-coupled from physical strains (e.g., tampering) in the security component 20.

Because the reference signal is temperature-dependent, the computer readable memory can include a lookup table having a reference signal for each of multiple temperatures within a given temperature range. The reference signal can include, for example, the primary lobe central wavelength, peak reflected power, and/or spectral template for each grouping of Bragg gratings in the optical fiber 10. The processor then compares the reflection spectrum against the appropriate reference signal, e.g., by pattern recognition, to authenticate the security component 20. In the case of deviations from the reference signal, the processor 34 can cause a communication or an alert that indicates tampering of the security component or the article to which it is attached.

Figure 6:
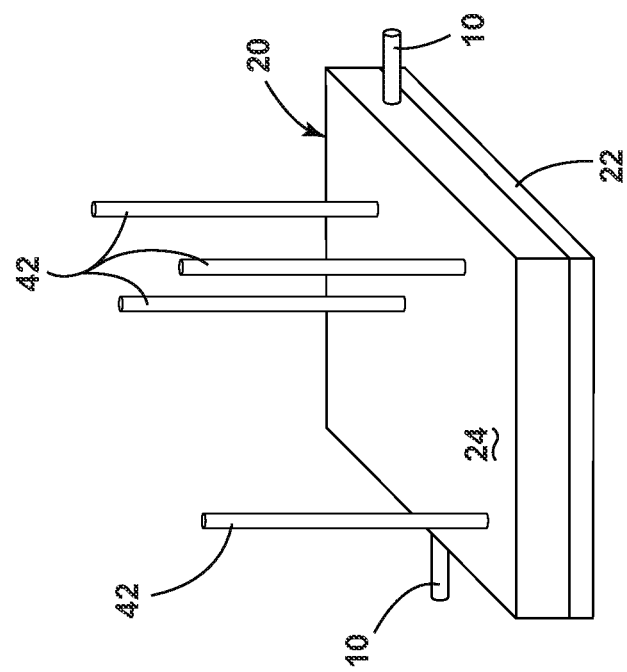
FIG. 6 includes first and second external stress fields applied to a security component for multi-party authentication and tamper detection.
Figure 6:
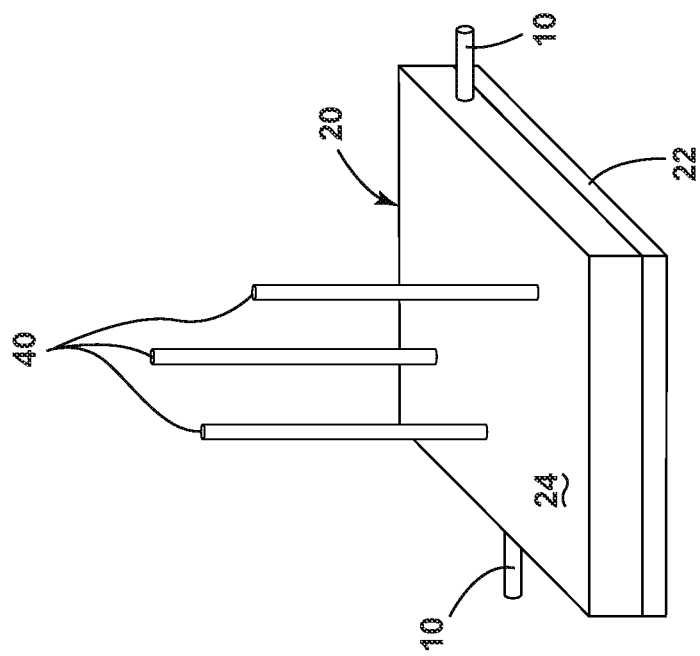

Multi-party use includes the addition of a physical stress field to the security component, the physical stress field being unique to each respective party. In particular, multi-party use includes the application of a temporary external pressure field to an exposed surface of the security component 20 while the FBG array is read out. This will cause the security component 20 to supply a different response than would be obtained without the external pressure field. More particularly, a first user applies a first external stress to the security component 20, the first external stress known only to the first user. A second user applies a second external stress to the security component 20, the second external stress known only to the second user and being different from the first external stress. The first and second external stresses can be caused by the same pin locations but with different forces, or can be caused by different pin locations with the same or different forces. As shown in FIG. 6, for example, the first external stress is caused when a first set of locations of the security component 20 are contacted by a first set of pins 40 (left), and the second external stress is caused when a second set of locations of the security component are contacted by a second set of pins 42 (right). Alternatively, the first external stress and the second external stress are caused by the same set of pins 40, but with different forces. The first reference signal includes a first plurality of reflection peaks corresponding to the plurality of Bragg gratings as modified by the first external stress, and the second reference signal includes a second plurality of reflection peaks corresponding to the plurality of Bragg gratings as modified by the second external stress. The first reference signal is used by the first user as a baseline for authentication and/or tamper detection, and the second reference signal is used by the second user as a baseline for authentication and/or tamper detection.

With the pressure field and its response known only to each user, it becomes very difficult to successfully counterfeit the security component's response for all parties. The security component is interrogated via a fiber optic connection, and such a connection can be retained for periodic remote inspections to ensure a monitored item's integrity remains unchanged. Because the signature is spectral rather than intensity based, it is immune to issues normally associated with long fiber-optic runs and the effects of nuclear damage. The FBG-based security component presents a new concept to authentication, in that different stakeholders can apply their own unique key to obtain a correspondingly unique signature from the security component, providing an additional level of security, and making it more difficult to spoof the security component.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. An article configured as a seal or tag to be attached to an object, the article comprising:
   a body coupled to the object; and
   a plurality of fiber Bragg gratings (FBGs) supported by the body and distributed through the body such that, when probed with light having a broad spectrum, the FBGs modify the broad spectrum by (1) a spectral response of the FBGs, and by:
   (2) a first spectral change corresponding to internal stresses caused by the manner in which the distributed FBGs are being supported in the body, and
   (3) a second spectral change corresponding to a first external stress caused when a first external-stress source is applied to the body by a first user,
   wherein a combination (1) of the spectral response of the FBGs, (2) the first spectral change, and (3) the second spectral change corresponds to a first key of the seal or tag associated with the first user.

2. The article of claim 1, wherein:
   the FBGs modify the broad spectrum by (1) the spectral response of the FBGs, (2) the first spectral change, and (4) a third spectral change, the third spectral change corresponding to a second external stress caused when, instead of the first external-stress source, a second external-stress source is applied to the body by a second user.

3. The article of claim 2, wherein:
   the first external stress is caused when a first set of locations of the body are contacted by a first set of pins, and
   the second external stress is caused when a second set of locations of the body are contacted by a second set of pins,
   wherein the first and second set of pins, or the first and second sets of locations on the body, or both, are different from each other.

4. The article of claim 1, wherein the body includes multiple epoxy layers, and wherein the distributed FBGs are disposed within the multiple epoxy layers.

5. The article of claim 1, wherein the body is resistant to nuclear radiation.

6. The article of claim 1, wherein the FBGs are serially disposed within a fiber core surrounded by a fiber cladding, and wherein the fiber core defines a refractive index that is different from a refractive index defined by the fiber cladding.

7. The article of claim 6, wherein the fiber core and the fiber cladding comprise an optical fiber, and wherein the optical fiber is disposed in a meandering two- or three-dimensional arrangement within the body.

8. The article of claim 1, wherein the body comprises an epoxy matrix including a thermoset resin or a thermoplastic resin.

9. The article of claim 1, wherein the body is planar and is supportably received on a lower substrate, the lower substrate comprising a metal or polymer layer.

10. The article of claim 9, further comprising an upper substrate opposite of the lower substrate, the upper substrate comprising a metal or polymer layer.

* * * * *